United States Patent [19]

Arai

[11] Patent Number: 4,752,199
[45] Date of Patent: Jun. 21, 1988

[54] MULTI-LAYER INJECTION MOLDING APPARATUS HAVING RUNNERS FOR DIVERTING RESIN FLOW

[75] Inventor: Takashi Arai, Tokyo, Japan

[73] Assignee: Canon Kabushiki Kaisha, Tokyo, Japan

[21] Appl. No.: 881,973

[22] Filed: Jul. 3, 1986

[30] Foreign Application Priority Data

Jul. 10, 1985 [JP] Japan .................................. 60-151790

[51] Int. Cl.⁴ ............................................. B29C 45/16
[52] U.S. Cl. ................................ 425/130; 264/328.8;
264/328.12; 425/562; 425/564; 425/572;
425/588
[58] Field of Search ................... 425/129 R, 130, 562,
425/564, 571, 572, 581, 588, 570, 817 R;
264/328.8, 328.12

[56] References Cited

U.S. PATENT DOCUMENTS

| | | | |
|---|---|---|---|
| 3,599,290 | 8/1971 | Garner | 425/817 |
| 3,733,156 | 5/1973 | Garner | 425/562 |
| 3,809,519 | 5/1974 | Garner | 425/564 |
| 3,888,612 | 6/1975 | Schrewe et al. | 425/130 |
| 4,403,933 | 9/1983 | Davis et al. | 425/129 |

Primary Examiner—Jay H. Woo
Assistant Examiner—Timothy W. Heitbrink
Attorney, Agent, or Firm—Fitzpatrick, Cella, Harper and Scinto

[57] ABSTRACT

In an injection resin machine, runners are provided perpendicular to the runners of the fixed plate in order to force the resin flow toward the sprues into a same direction and to achieve uniform resin pressure in the proceeding direction, thus realizing uniform injection into the runners.

3 Claims, 5 Drawing Sheets

MULTI-LAYER INJECTION MOLDING APPARATUS HAVING RUNNERS FOR DIVERTING RESIN FLOW

BACKGROUND OF THE INVENTION

1. Field of the Invention

The present invention relates to an injection molding apparatus, and in particular to an injection molding apparatus for forming a hollow molded product with plural resin materials such as two-color injection molding or sandwich molding.

2. Related Background Art

Injection molding of hollow products such as buckets, boxes or bottles with plural resin materials is known as two-color molding.

So-called sandwich injection molding machines for injecting a core layer resin into a skin layer resin for increasing the mechanical strength of the hollow product is already known in various forms.

When the sandwich injection molding technology is used for the production of optical instruments such as components of a lens tube of an interchangeable camera lens, the following conditions should be satisfied:

(1) the injection process is short and can be completed quickly;

(2) plural resin materials are not mutually mixed; and (3) the core layer is uniformly injected into the skin layer in any cross section of the molded product.

In a conventional two-color injection molding machine, a fixed plate is connected to first and second injecting cylinders; a mold plate having a molding gap and a runner plate is positioned between said fixed plate and mold plate, and sprues are provided for injecting resin into the fixed plate. After injecting a first resin, a metal mold unit composed of the fixed plate, runner plate and mold plate is moved by rotation or displacement with respect to the injecting cylinders so as to expand the gap provided in the mold plate, and a second resin is infected to change the specie of resin flowing into the sprues of the fixed plate.

However, in such conventional structure, the first resin has already cooled and solidified when the second resin is injected because the rotational movement or displacement takes time, so that the second resin becomes attached around the first resin or to a part thereof. Consequently, insufficient adhesion strength between the first and second resins is usually supplemented by mechanical means such as a flange. Also, since the second resin is injected after the first resin is cooled, the cooled first resin is subjected to an external force due to the injecting pressure of the second resin, and, for this reason, it has been considered difficult to obtain molded products of a high precision.

Because of the above-mentioned reasons, it has been considered impossible to produce optical instruments, such as lens tube components of an interchangeable camera lens, because of the required high precision.

There has been proposed a sandwich molding machine for injecting first resin and then injecting second resin while said first resin is still in melted state, thereby surrounding the second resin with the first resin, as disclosed in the U.S. Pat. Nos. 3,809,519, 3,599,290 and 3,733,156. However these patents switch the first and second resins with a rotary or sliding valve which requires a certain time, so that the first resin is cooled to significantly increase the pressure loss at the injection of the second resin. It is therefore difficult to maintain the precision of the molded product. In addition the flow characteristic of the first or second resin is not stabilized because of the first or second resin remaining in, in front of, or behind the valve, so that the ratio of the first and second resins fluctuates and the molding precision is difficult to maintain.

In consideration of the aforementioned drawbacks the present inventors have reached the present invention through investigations with the objectives that:

(1) the injection process can be completed within a short time;

(2) plural resin materials are not mutually mixed;

(3) ratio of the skin layer and the core layer is uniform in various cross sections of the molded product;

(4) the resin material used in an injection process does not remain in a further injection process;

(5) the resin material should not remain except in the injecting cylinders;

(6) the pressure loss in the resin flow path should be small at the injection;

(7) no switching means should be present in the resin flow path;

(8) molded products should be continuously and stably obtained with a high precision; and (9) the resin material should be poured uniformly into plural runners or gates, as employed.

SUMMARY OF THE INVENTION

An object of the present invention is to provide an apparatus capable of uniform sandwich molding in forming hollow products, such as lens tube components explained before.

Another object of the present invention is to provide an injection molding apparatus capable of avoiding the complication in structure of the aforementioned moving mechanism and the increase in the molding process time caused by displacement of the mold.

BRIEF DESCRIPTION OF THE DRAWINGS

FIGS. 1 to 8 illustrate a first embodiment of the present invention, wherein;

FIGS. 9 to 11 are views showing another embodiment of the present invention.

DETAILED DESCRIPTION OF THE PREFERRED EMBODIMENTS

Figure 1:
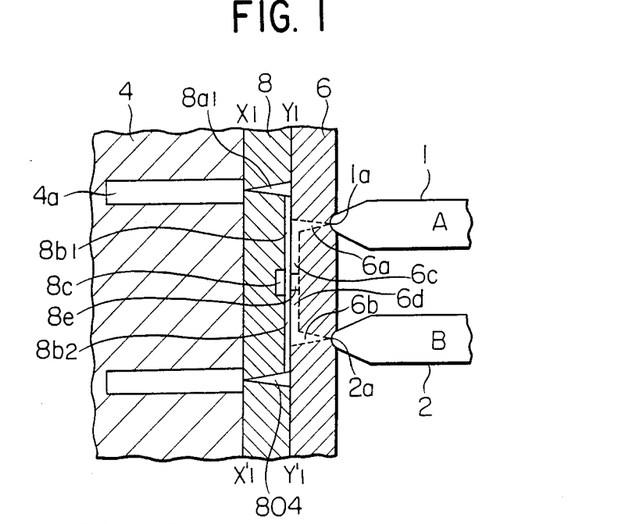
FIG. 1 is a partial cross-sectional view of an injection molding machine.

FIGS. 1 to 8 illustrate a first embodiment of the present invention. FIG. 1 is a partially cross-sectional view of an apparatus of said embodiment, wherein provided are first and second injection cylinder units 1, 2. The first injection cylinder unit is used for injecting, from an outlet 1a thereof, a resin material A constituting the skin layer, and the second injection cylinder unit is used for injecting, from an outlet 2a, a resin material B constituting the core layer.

A mold member 4 is provided with a cavity 4a for molding a hollow cylindrical member such as a tube member of an interchangeable lens tube.

A fixed plate 6 is provided with sprues 6a, 6b respectively connected to the outlets 1a, 2a of the above-mentioned first and second injection cylinder units.

A runner plate 8 is positioned between the mold member 4 and the fixed plate 6. A junction plane X1—X1' between the mold member and the runner plate 6 is perpendicular to the axis of the hollow cylindrical molded product obtained with the mold member 4.

Y1—Y1' indicates a junction plane between the runner plate and the fixed plate.

In the runner plate 8 there are provided runners 8a1, 8a2, ... parallel to the cavity 4a of the mold member 4; and sprues 8b1, 8b2, ... parallel to said junction plane X1—X1' and connected with said runners 8a1, 8a2, ...

On said sprues 6a, 6b of the fixed plate 6 there are provided runners 6c, 6d parallel to said junction plane X1—X1' and connected to said sprues 6a, 6b, and at the exit side of the runners 6c, 6d there is formed a runner 6e perpendicular to said junction plane X1—X1'.

Said perpendicular runner 6e is connected to the aforementioned parallel runners 8b1, 8b2, ... of the runner plate 8. 8c indicates a runner lock.

Figure 2A:
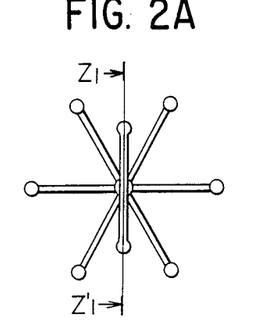
FIG. 2A is a cross-sectional view along a direction Y1—Y1' in FIG. 1.
Figure 2B:
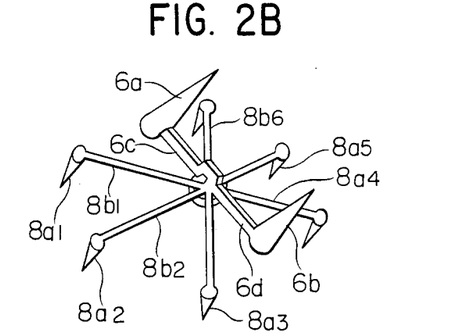
FIG. 2B is a perspective view of runner resin.

FIGS. 2A and 2B are respectively a plan view and a perspective view of the resin flowing in the runners 8a1, 8a2, ... 8b1, 8b2, ... runner lock 8c, sprues 6a, 6b and runners 6c, 6d, 6e.

Figure 2C:
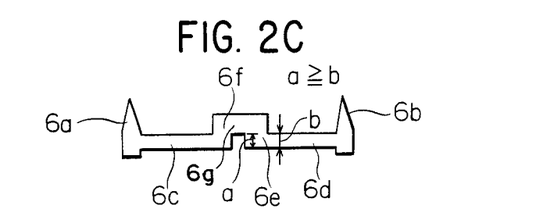
FIG. 2C is a cross-sectional view along a direction Z1—Z1' in FIG. 2A.

FIG. 2C is a cross-sectional view of the sprues and runners of the fixed plate. At the exit of the runner 6c parallel to the aforementioned junction plane X1—X1' there is provided a perpendicularly elevated runner 6f, which is connected to the aforementioned perpendicular runner 6e.

In FIG. 2C, a indicates the height of wall facing the exit of the runner 6d, and b indicates the diameter of the runner 6d.

The resin A flowing in the runner 6c is diverted in the runner 6f, and is again diverted perpendicularly by the runner 6e, but because of a dimensional condition a≧b, it hardly runs toward the runner 6d.

Also because of the same dimensional condition, the resin flowing in the runner 6d hardly flows toward the runner 6f.

Figure 3A:
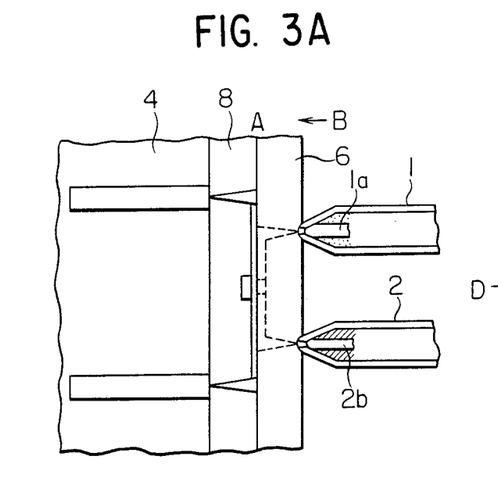
FIG. 3A is a cross-sectional view showing a state in which the resin is not yet injected.
Figure 3B:
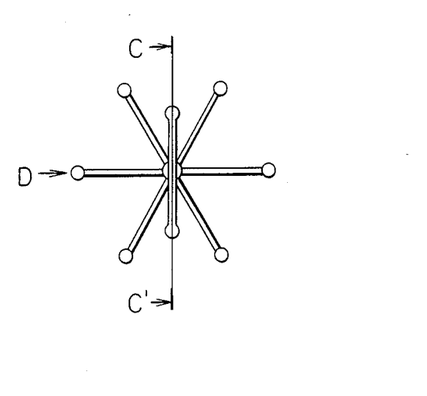
FIG. 3B is a cross-sectional view along a direction Y1—Y1' in FIG. 3.
Figure 8:
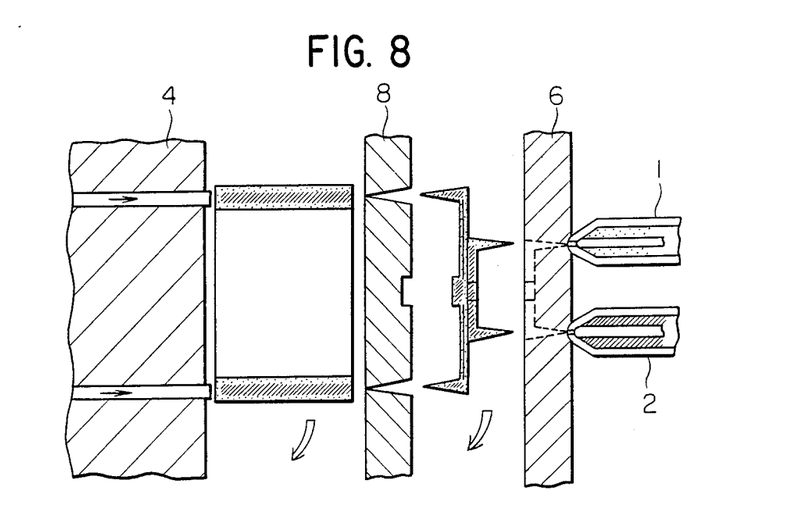
FIG. 8 is a cross-sectional view showing a step of removing remaining runners.

FIGS. 3 and 8 illustrate the function of the present embodiment. FIGS. 3A and 3B show a state in which the resin is not yet injected into the fixed plate 6, runner plate 8 and mold member 4, which are maintained in position by an unrepresented tightening unit, wherein the runners, sprues and cavity in the mold member are mutually connected. The outlets 1a, 2a of the first and second injection cylinders 1, 2 are closed by needle valves 1b, 2b. In the uninjected state shown in FIG. 3A, the resin is not yet introduced into the runners shown in FIG. 3B.

Figure 4A:
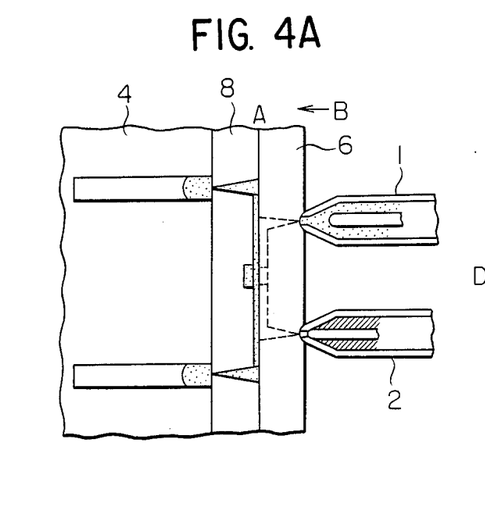
FIG. 4A is a cross-sectional view showing an injection process of skin layer resin.
Figure 4B:
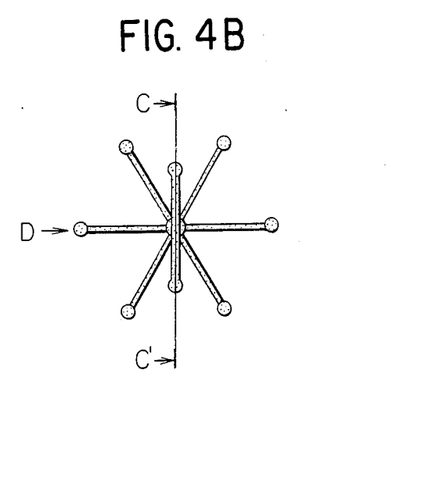
FIG. 4B is a cross-sectional view along a direction Y1—Y1' in FIG. 4.

In a skin resin injecting step, the needle valve 1b in the first injection cylinder unit 1 is opened as shown in FIG. 4A, whereby the skin layer resin A in said unit is injected, through the sprue 6a and runner 6c of the fixed plate and the runners 8a1-8c of the runner plate, into the molding cavity 4a. After leaving the outlet 1a, the skin layer resin A enters the conical sprue 6a and then the horizontal runner 6c. Then the resin A is diverted, at the exit of the runner 6c, by the perpendicular runner 6f, and again diverted by the perpendicular runner 6e, into a direction perpendicular to the horizontal sprues 8a1–8a6 of the runner plate 8. Thus the skin layer resin A is injected into the cavity 4a through a single runner 6c, perpendicular runner 6e and runners 8b1-8b6, 8a1-8a6, and the presence of the perpendicular runner 6e allows to apply almost uniform resin pressures to the runner 8b1-8b6 to which the resin is supplied from the injection cylinder unit 1 through the horizontal runner 6c. Consequently, as shown in FIG. 4B, the resin A is uniformly injected, with almost uniform pressure, into the conical perpendicular runners 8a1-8a6 of the runner plate 8.

After a predetermined amount of the skin layer resin A is injected into the molding cavity, the needle valve 1b of the first injection cylinder unit is closed, and the needle valve 2b of the second injection cylinder unit 2 is opened to inject the core layer resin B.

Figure 5A:
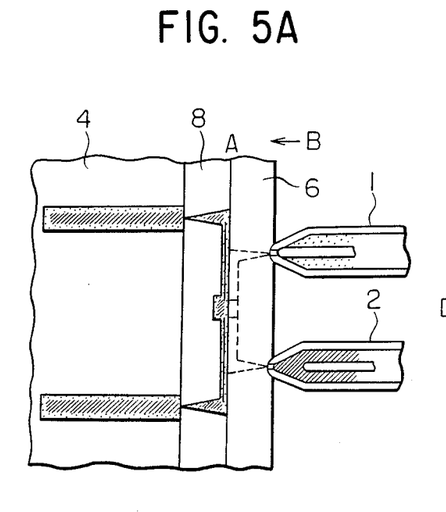
FIG. 5A is a cross-sectional view showing an injection process of core layer resin.
Figure 5B:
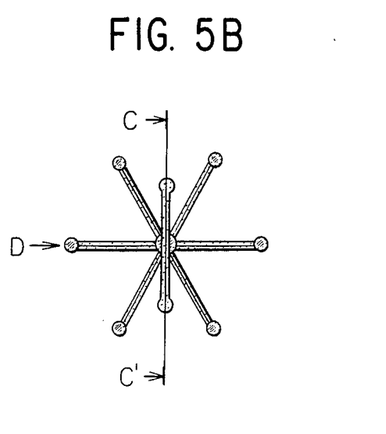
FIG. 5B is a cross-sectional view along a direction Y1—Y1' in FIG. 5A.

In this injection step, said needle valve 2b is opened and the core layer resin B is injected into the sprue 6b of the fixed plate 6. Though the sprues 6b and the runner 6d are filled with the resin A of the preceding injection step, said resin is still in melted state. Thus, pushing the resin A, the resin B goes through the sprues 6b, 6d, runners 8b1-8b6, 8a1-8a6 and enters the cavity 4a of the mold member 4. The core layer resin B entering the cavity 4a intrudes in the skin layer resin A, thus pushing said skin resin A against the wall of the cavity 4a.

In this manner the core layer resin B emitted from the outlet 2a is injected into the runners 8b1-8b6 of the runner plate 8 through the sprue 6b and horizontal runner 6d, and, after passing said runner 6d, the flow of the core layer resin B collides with a wall 6g constituting the perpendicular runner 6e and positioned opposite to the exit of the runner 6d and is forcedly diverted toward the exit of said perpendicular runner 6e.

By said perpendicular diversion of the core layer resin B by the runner 6e allows the resin B to be uniformly divided and injected into the runners 8b1-8b6 of the runner plate 8.

Figure 6A:
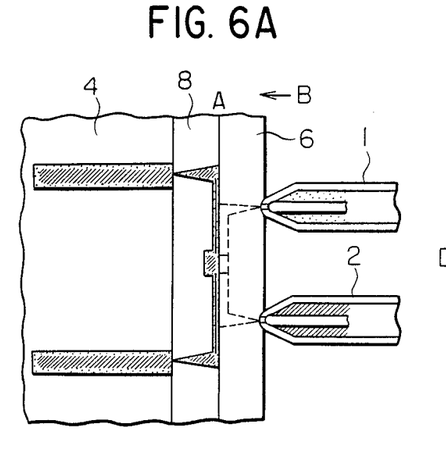
FIG. 6A is a cross-sectional view showing the completed state of an injection process.
Figure 6B:
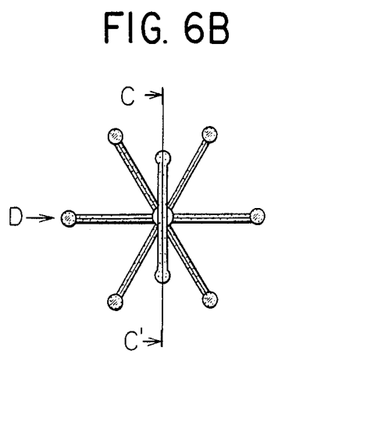
FIG. 6B is a cross-sectional view along a direction Y1—Y1' in FIG. 6A.

After the injection of a predetermined amount of the core layer resin B and the holding of a predetermined pressure for a predetermined period, the needle valve 2b of the second injection cylinder unit 2 is closed and cooling is executed for a suitable period (FIGS. 6A and 6B).

Figure 7:
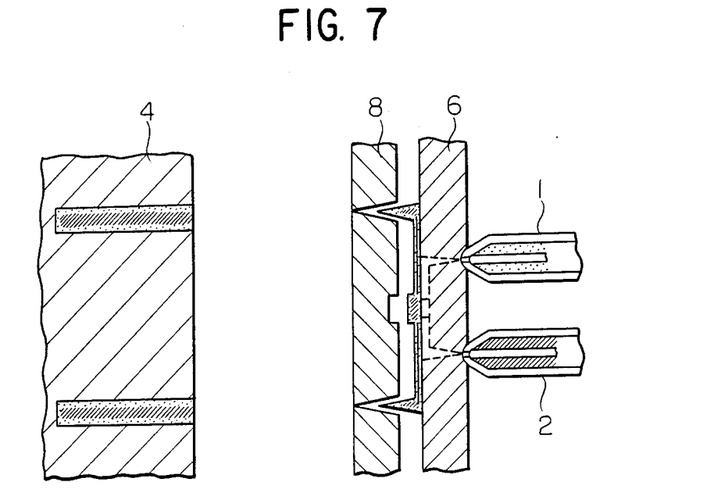
FIG. 7 is a cross-sectional view showing a step of removing a molded product.

After the steps shown in FIGS. 3A, 3B to 6A, 6B, the molded product is taken out of the mold, as shown in FIG. 7, by separating the mold member 4 from the junction plane X1—X1' shown in FIG. 1 and pushing out the molded product in the cavity by means of unrepresented pushing means.

Subsequently said junction plane Y1—Y1' is separated, and the core layer resin B is removed from the runners and sprues (FIG. 8).

In this manner there is completed a series of steps from the injection of the skin layer resin A to the removal of the molded product. Subsequently the mold member 4, runner plate 8 and fixed plate 6 are tightened together for a succeeding molding operation.

Figures 9A, 9B:
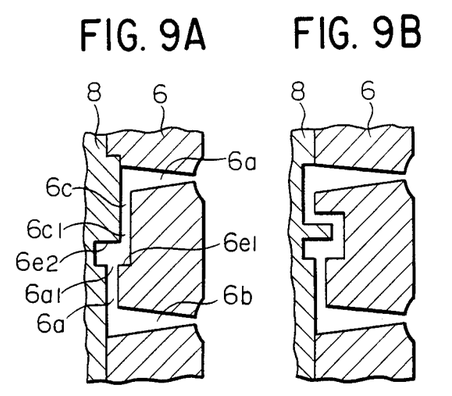
Figure 9C:
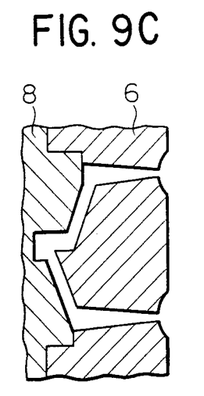

FIG. 9 and ensuing illustrations show variations of the embodiment shown in FIGS. 1 to 8.

FIG. 9A shows a variation in which junctions $6c1$, $6d1$ of the exits of horizontal runners $6c$, $6d$ and the perpendicular runner $6e$ are mutually displaced in the vertical direction. With such mutually displaced arrangements of said junctions $6c1$ and $6d1$, the skin layer resin A coolides with a wall $6e1$ opposite to the junction $6c1$ and is thus forcedly diverted. Also the core layer regin B collides with a wall $6e2$ opposite to the junction $6d1$ and is likewise forcely diverted. In this manner the flow direction of the resins A, B can be changed by such mutually displaced arrangement of the exits of the horizontal runners $6c$, $6d$. Also the resin flows perpendicularly into an entrance at the center of plural sprues of the runner plate, and it therefore injected uniformly into radially extending plural sprues.

FIG. 9B shows a variation in which the horizontal runner of the fixed plate 6 is formed, instead, in the runner plate.

FIG. 9C shows a variation in which the horizontal runners of the fixed plate are inclined, in order to reduce the pressure loss at the resin injection.

If the resins are guided directly from the horizontal runners $6c$, $6d$ to the perpendicular runner $6e$ as shown in FIGS. 1 to 8 and FIGS. 9A and 9B, the skin layer resin A passing through the horizontal runner $6c$ is applied not only in the direction of the perpendicular runner $6e$ but also in the direction of the horizontal runner $6d$, thus resulting in a pressure loss, so that the injection pressure of the injection cylinder is not effectively supplied to the perpendicular runner $6e$.

Also at the injection of the core layer resin B, the pressure thereof in the horizontal runner $6d$ is applied also to the horizontal runner $6c$ filled with the skin layer resin A, thus causing a pressure loss.

On the other hand, if the horizontal runners $6c$, $6d$ of the fixed plate are inclined with respect to the aforementioned junction plane X1—X1' as shown in FIG. 9C, the resin A or B from respectively injection cylinder easily flows into the perpendicular runner $6e$, with easier change of direction, and the injected resin is prevented from entering the runner of the other resin, with much reduced pressure loss.

Figure 10A:
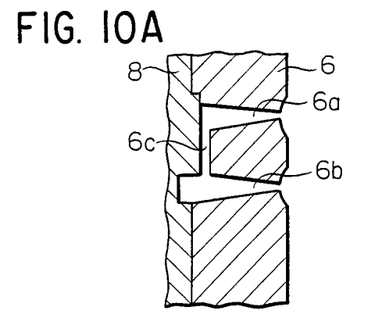
Figure 10B:
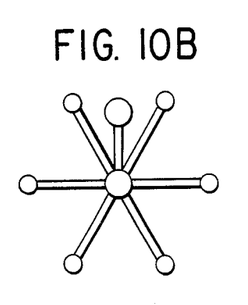

FIGS. 10A and 10B show a variation for molding a product easily affected by pressure loss. In case the present invention is applied to the molding of a helicoid tube of a lens tube, a polycarbonate resin is used as the skin layer resin A while a carbon-containing polycarbonate resin is used as the core layer resin B. A high-precision product of a thickness much smaller than the logitudinal dimension or diameter of the tube as in the case of helicoid tube may not be able to attain sufficient physical strength and precision in case of a large injection pressure loss at the injection of the core layer resin, since it does not reach the ends of cavity and is unable to form a uniform sandwich structure.

FIGS. 10A and 10B illustrate a variation for resolving the above-mentioned drawback. In this variation, the runner of the fixed plate 6 for the core layer resin B is directly connected to the perpendicular runner without the horizontal runner, thus avoiding the pressure loss resulting therefrom.

In FIGS. 10A and 10B, the skin layer resin A ejected from an unrepresented first injection cylinder unit passes through the sprue $6a$ and horizontal runner $6c$ to reach the perpendicular runner $6e$, in the same manner as in the foregoing embodiments.

Subsequent to the injection of the skin layer resin A, the core layer resin B is injected, from an unrepresented second injection cylinder unit into the sprue $6b$ of the fixed plate 6, directly connected to the perpendicular runner $6e$, so that the pressure of said resin B is applied directly to the perpendicular runner $6e$ along the direction of injection pressure. The pressure loss is made very small since the core layer resin B scarcely enters the horizontal runner $6c$ and the injection pressure is substantially applied to the perpendicular runner $6e$.

Figure 11A:
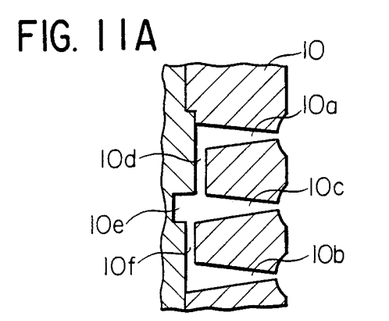
Figure 11B:
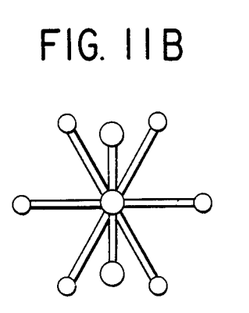

FIGS. 11A and 11B illustrate a molding machine for sandwich injection of a three-layered molded product.

In case sandwich molding is desirable for improving the physical strength of a relatively thick product such as casing of parts of industrial or office appliances but requires a high cost due to a large amount of resin required for the large thickness, the resin constituting the core layer is divided into two portions, i.e. a first core layer resin of a high mechanical strength and a second core layre resin of a relatively low cost.

A fixed plate 10 shown in FIG. 11A is connected to unrepresented first, second and third injection cylinder units, which respectively inject skin layer resin, first core layer resin and second core layer resin into sprues $10a$, $10b$ and $10c$.

The sprue $10a$ is connected through a horizontal runner $10d$ to a perpendicular runner $10e$, while the sprue $10b$ is connected through a horizontal runner $10f$ to the perpendicular runner $10e$, and the sprue $10c$ is directly connected to the perpendicular runner $10e$. The junctions of said horizontal runner $10d$, $10f$ with the perpendicular runner $10e$ are mutually displaced as already shown in FIG. 9A.

As detailedly explained in the foregoing, in a sandwich molding machine in which injection cylinder units for injecting plural resins are connected to a fixed plate with a fixed relationship thereto and inject resins at suitable timings into a cavity of a mold member, the present invention enables uniform resin injection into the cavity within a short time.

The molding time can be shortened by increasing the number of runners in the runner plate 8 communicating with the cavity of the mold member, but the use of such plural runners will result in uneven injection, thus leading to uneven sandwich molding and a deterioration in the quality of molded product. However, in the present invention, the fixed plate is provided with a perpendicular runner through which the resin passes from the runners of the fixed plate to the runners of the runner plate, and said perpendicular runner forcedly generates a uniform flow direction of the resin toward the sprues with uniform pressure, thereby realizing uniform amounts of injection into different runners.

In addition the present invention provides an injection molding machine in which the junctions of the horizontal runners $6c$, $6d$ with the perpendicular runners are mutually displaced in the vertical direction, thereby minimizing the pressure loss at the resin injection and reducing the error in the amount of resin injection and in the injection time.

What I claim is:

1. An injection molding machine comprising:

a first injection cylinder for injecting a first resin for forming a skin layer;

a second injection cylinder for injecting a second resin for forming a core layer;

a fixed plate connected with said first and second injection cylinders;

a mold member provided with a cavity for molding a molded product; and a runner plate positioned between said fixed plate and said mold member having a first parallel runner to a junction plane with said fixed plate;

wherein said fixed plate is provided with first and second sprues through which said first and second resins respectively pass and which said sprues are perpendicular to said junction plane, and a second parallel runner which connects said perpendicular sprues with said first runner and which said second parallel runner is parallel to said junction plane, and wherein a wall for changing a flow of said first resin from said first perpendicular sprue on said fixed plate to said second parallel runner is shifted from a wall for changing a flow of said second resin from said second perpendicular sprue on said fixed plate to said first parallel runner.

2. An injection molding machine comprising:

a first injection cylinder for injecting a first resin for forming a skin layer;

a second injection cylinder for injecting a second resin for forming a core layer;

a fixed plate connected with said first and second injection cylinders;

a mold member provided with a cavity for molding a molded product; and a runner plate positioned between said fixed plate and said mold member and having a first parallel runner to a junction plane with said fixed plate;

wherein said fixed plate is provided with first and second parallel sprues through which said first and second resins respectively pass and which are perpendicular to said junction plane, a second parallel runner which connects the first parallel runner on said runner plate and a third parallel runner connecting between said first and second parallel runners, and wherein walls for changing flows of said first and second resins directed toward said second parallel runner are shifted from each other on said second parallel runner.

3. An injection molding machine comprising:

a first injection cylinder for injecting a first resin for forming a skin layer;

a second injection cylinder for injecting a second resin for forming a core layer;

a fixed plate connected with said first and second injection cylinders;

a mold member provided with a cavity for molding a molded product; and a runner plate positioned between said fixed plate and said mold member and having a first parallel runner to a junction plane with said fixed plate;

wherein said fixed plate is provided with first and second sprues through which said resins from said first and second injection cylinders respectively pass and which are perpendicular to said junction plane, and a second parallel runner which connects said first sprue with the first parallel runner and which said second parallel runner is parallel to said junction plane, wherein said first resin advances through said first sprue and said second parallel runner on said fixed plate to the first parallel runner on said runner plate and flows against a wall of said second parallel runner to be diverted and said second resin advances from said second sprue to the first runner on the runner plate.

* * * * *

UNITED STATES PATENT AND TRADEMARK OFFICE
CERTIFICATE OF CORRECTION

PATENT NO. : 4,752,199
DATED : June 21, 1988
INVENTOR(S) : Takashi Arai

It is certified that error appears in the above-identified patent and that said Letters Patent is hereby corrected as shown below: Title page:

[57] ABSTRACT

Line 1, "resin machine" should read --resin molding machine--.

COLUMN 1

Line 21, "the" should be deleted; and

Line 40, "infected" should read --injected-- and "specie" should read --species--.

COLUMN 4

Line 34, "sprues 6b" should read --sprue 6b--; and

Line 50, "By said" should read --Said--.

COLUMN 5

Line 13, "coolides" should read --collides--;

Line 15, "regin B" should read --resin B--;

Line 45, "respectively" should read --the respective--; and

Line 57, "logitudinal" should read --longitudinal--.

UNITED STATES PATENT AND TRADEMARK OFFICE
CERTIFICATE OF CORRECTION

PATENT NO. : 4,752,199

DATED : June 21, 1988

INVENTOR(S) : Takashi Arai

It is certified that error appears in the above-identified patent and that said Letters Patent is hereby corrected as shown below:

<u>COLUMN 6</u>

Line 25, "layre" should read --layer--; and

Line 36, "runner" should read --runners--.

Signed and Sealed this

Twenty-seventh Day of June, 1989

Attest:

DONALD J. QUIGG

*Attesting Officer*     *Commissioner of Patents and Trademarks*